United States Patent [19]
Holden et al.

[11] Patent Number: 5,869,953
[45] Date of Patent: Feb. 9, 1999

[54] RETROFITTABLE ENERGY SAVING DEVICE

[76] Inventors: Keith D. Holden; David Armstrong, both of 13 Brown Stone Crescent, Courtice, Ontario, Canada, L1E 2Y1

[21] Appl. No.: 985,406

[22] Filed: Dec. 4, 1997

[51] Int. Cl.⁶ ........................................................ G05F 1/70
[52] U.S. Cl. ........................... 323/209; 323/364; 323/233
[58] Field of Search .................................. 439/620, 622, 439/621; 323/208, 209, 210, 364, 233

[56] References Cited

U.S. PATENT DOCUMENTS

| | | | |
|---|---|---|---|
| 4,606,597 | 8/1986 | Bielefeld | 439/620 |
| 4,954,765 | 9/1990 | Hu | 323/217 |

Primary Examiner—Shawn Riley

[57] ABSTRACT

A power lag compensation device is provided including a housing. A socket assembly is situated within the interior space of the housing for releasably receiving a plug connected to an appliance for being in electrical communication therewith. A plug assembly is mounted on the housing and extended therefrom exterior of the housing. The plug assembly includes a pair of spaced parallel rectangular prongs. The rectangular prongs each have an associated interconnect wire connected to a corresponding socket of the socket assembly. The plug assembly serves to releasably insert within a socket which is connected to an alternating current power source. A triggering mechanism is connected in communication with one of the interconnect wires within the housing. The triggering mechanism is adapted for producing an activation signal upon the detection of a current flow therethrough. A triac is connected between the interconnect wires within the housing with the triac having a gate connected to the triggering mechanism for allowing communication between the interconnect wires only during the receipt of the activation signal. Finally, a capacitor is connected between the interconnect wires in series with the triac means for providing a predetermined amount of power lag compensation when the triac means is in receipt of the activation signal.

9 Claims, 2 Drawing Sheets

RETROFITTABLE ENERGY SAVING DEVICE

BACKGROUND OF THE INVENTION

1. Field of the Invention

The present invention relates to power lag compensators and more particularly pertains to a new retrofittable energy saving device for lengthening the life of appliances, saving energy and reducing the load on power utilities.

2. Description of the Prior Art

The use of power lag compensators is known in the prior art. More specifically, power lag compensators heretofore devised and utilized are known to consist basically of familiar, expected and obvious structural configurations, notwithstanding the myriad of designs encompassed by the crowded prior art which have been developed for the fulfillment of countless objectives and requirements.

Known prior art power lag compensators include U. S. Pat. No. 4,876,497; U.S. Pat. No. 3,932,808; U.S. Pat. No. 4,554,502; U.S. Pat. No. 5,387,821; U.S. Pat. No. 4,356,440; and U.S. Pat. No. Des. 244,095.

In these respects, the retrofittable energy saving device according to the present invention substantially departs from the conventional concepts and designs of the prior art, and in so doing provides an apparatus primarily developed for the purpose of lengthening the life of appliances, saving energy and reducing the load on power utilities.

SUMMARY OF THE INVENTION

In view of the foregoing disadvantages inherent in the known types of power lag compensators now present in the prior art, the present invention provides a new retrofittable energy saving device construction wherein the same can be utilized for lengthening the life of appliances, saving energy and reducing the load on power utilities.

The general purpose of the present invention, which will be described subsequently in greater detail, is to provide a new retrofittable energy saving device apparatus and method which has many of the advantages of the power lag compensators mentioned heretofore and many novel features that result in a new retrofittable energy saving device which is not anticipated, rendered obvious, suggested, or even implied by any of the prior art power lag compensators, either alone or in any combination thereof.

To attain this, the present invention generally comprises a housing having a rectilinear configuration with a top face, a bottom face, a pair of side faces and a pair of end faces integrally coupled therebetween for defining an interior space. As shown in FIG. 4, each end face has an aperture assembly including a pair of parallel elongated slots with a semicircular bore mounted thereunder. Shown in FIG. 4 is a socket assembly situated within the interior space of the housing and in communication with an associated one of the aperture assemblies. The socket assembly is adapted to releasably receive a plug connected to an appliance for being in electrical communication therewith. Associated therewith is a three prong plug assembly mounted within an associated one of the apertures assemblies and extending therefrom exterior of the housing. The plug assembly includes a pair of spaced parallel rectangular prongs and a cylindrical prong. Such rectangular prongs each have an associated interconnect wire connected to a corresponding socket of the socket assembly. The cylindrical prong has a ground wire connected to a socket of the socket assembly associated with one of the semicircular apertures of the housing. In use, the plug assembly serves to be releasably inserted within a socket which is connected to an alternating current power source.

Shown in FIG. 1 is triggering means in communication with one of the interconnect wires within the housing. In operation, the triggering means is adapted for producing an activation signal upon the detection of a current flow therethrough. Connected between the interconnect wires within the housing is a triac. The triac has a gate connected to the triggering means for allowing communication between the interconnect wires only during the receipt of the activation signal. Finally, a capacitor is connected between the interconnect wires in series with the triac for providing a predetermined amount of power lag compensation when the triac is in receipt of the activation signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retrofittable energy saving device apparatus and method which has many of the advantages of the power lag compensators mentioned heretofore and many novel features that result in a new retrofittable energy saving device which is not anticipated, rendered obvious, suggested, or even implied by any of the prior art power lag compensators, either alone or in any combination thereof.

It is another object of the present invention to provide a new retrofittable energy saving device which may be easily and efficiently manufactured and marketed.

It is a further object of the present invention to provide a new retrofittable energy saving device which is of a durable and reliable construction.

An even further object of the present invention is to provide a new retrofittable energy saving device which is susceptible of a low cost of manufacture with regard to both materials and labor, and which accordingly is then susceptible of low prices of sale to the consuming public, thereby making such retrofittable energy saving device economically available to the buying public.

Still yet another object of the present invention is to provide a new retrofittable energy saving device which provides in the apparatuses and methods of the prior art some of the advantages thereof, while simultaneously overcoming some of the disadvantages normally associated therewith.

Still another object of the present invention is to provide a new retrofittable energy saving device for lengthening the life of appliances, saving energy and reducing the load on power utilities.

Even still another object of the present invention is to provide a new retrofittable energy saving device that includes a housing. A socket assembly is situated within the interior space of the housing for releasably receiving a plug connected to an appliance for being in electrical communication therewith. A plug assembly is mounted on the housing and extended therefrom exterior of the housing. The plug assembly includes a pair of spaced parallel rectangular prongs. The rectangular prongs each have an associated interconnect wire connected to a corresponding socket of the socket assembly. The plug assembly serves to releasably insert within a socket which is connected to an alternating current power source. A triggering mechanism is connected in communication with one of the interconnect wires within the housing. The triggering mechanism is adapted for producing an activation signal upon the detection of a current flow therethrough. A triac is connected between the interconnect wires within the housing with the triac having a gate connected to the triggering mechanism for allowing communication between the interconnect wires only during the receipt of the activation signal. Finally, a capacitor is connected between the interconnect wires in series with the triac means for providing a predetermined amount of power lag compensation when the triac means is in receipt of the activation signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
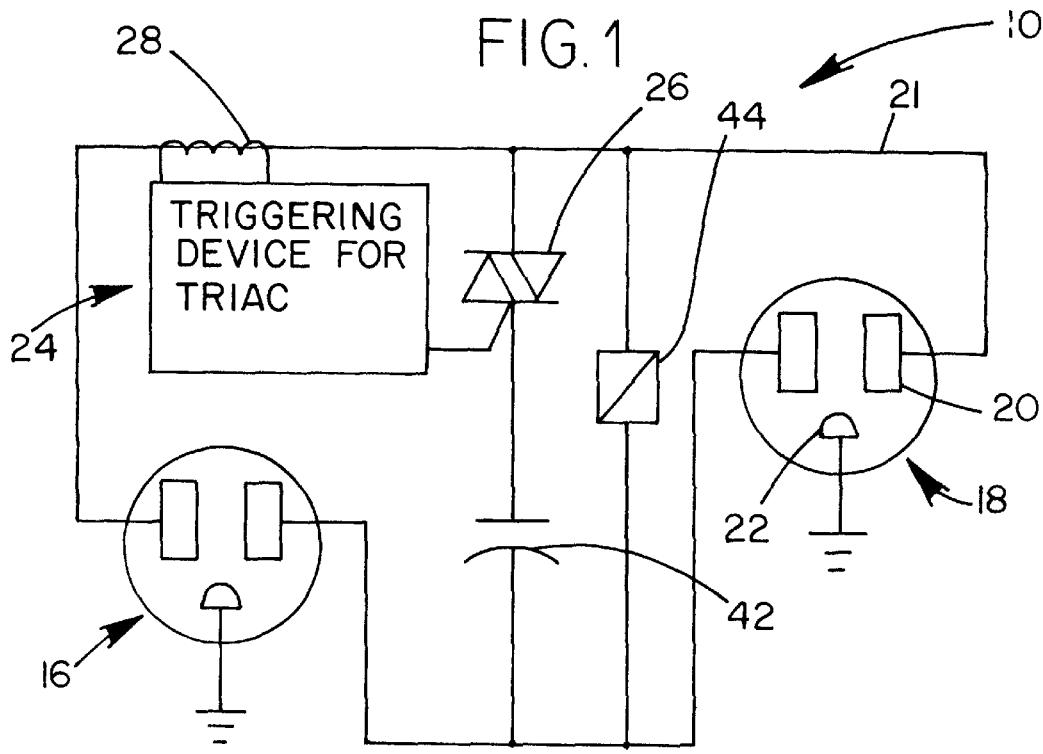
FIG. 1 is a schematic diagram of the present invention.

With reference now to the drawings, and in particular to FIGS. 1 through 4 thereof, a new retrofittable energy saving device embodying the principles and concepts of the present invention and generally designated by the reference numeral 10 will be described.

Figure 4:
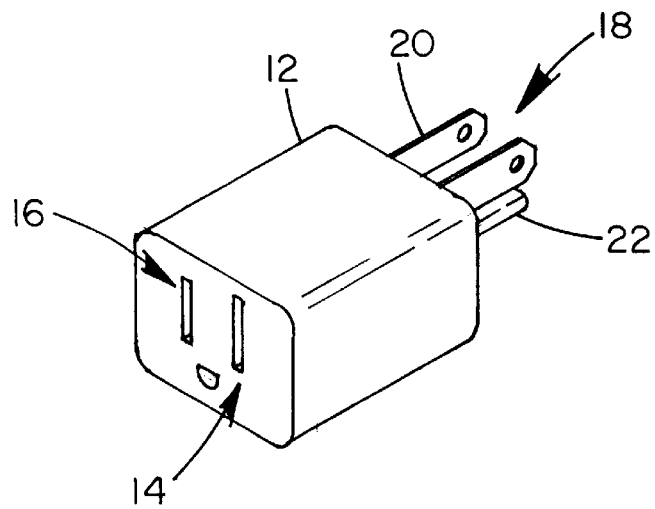
FIG. 4 is a perspective view of the external appearance of the present invention.

The present invention, as designated as numeral 10, includes a housing 12 having a rectilinear configuration with a top face, a bottom face, a pair of side faces and a pair of end faces integrally coupled therebetween for defining an interior space. The housing ideally has a length of about 3 inches, a width of about 2 and ½ inches, and a height of about 2 inches. As shown in FIG. 4, each end face has an aperture assembly 14 including a pair of parallel elongated slots with a semicircular bore mounted thereunder.

Shown in FIG. 4 is a socket assembly 16 situated within the interior space of the housing and in communication with an associated one of the aperture assemblies. The socket assembly is adapted to releasably receive a plug connected to an appliance for being in electrical communication therewith.

Associated therewith is a three prong plug assembly 18 mounted within an associated one of the apertures assemblies and extending therefrom exterior of the housing. The plug assembly includes a pair of spaced parallel rectangular prongs and a cylindrical prong. Such rectangular prongs 20 each have an associated interconnect wire 21 connected to a corresponding socket of the socket assembly. The cylindrical prong 22 has a ground wire connected to a socket of the socket assembly associated with one of the semicircular apertures of the housing. In use, the plug assembly serves to be releasably inserted within a socket which is connected to an alternating current power source.

Shown in FIG. 1 is a current controlled triggering means 24 in communication with one of the interconnect wires within the housing. In operation, the triggering means is adapted for producing an activation signal upon the detection of a current flow therethrough.

Connected between the interconnect wires within the housing is a triac 26. The triac has a gate connected to the triggering means for allowing communication between the interconnect wires only during the receipt of the activation signal.

Figure 2:
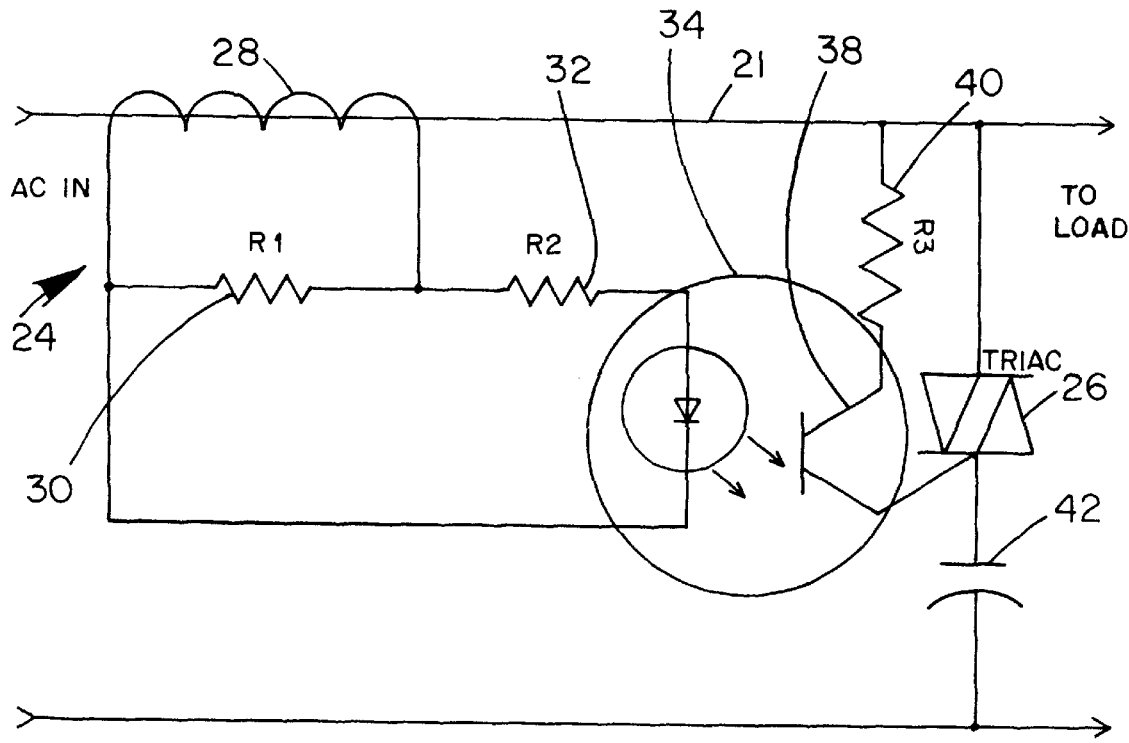
FIG. 2 is a schematic diagram of another embodiment of the present invention.
Figure 3:
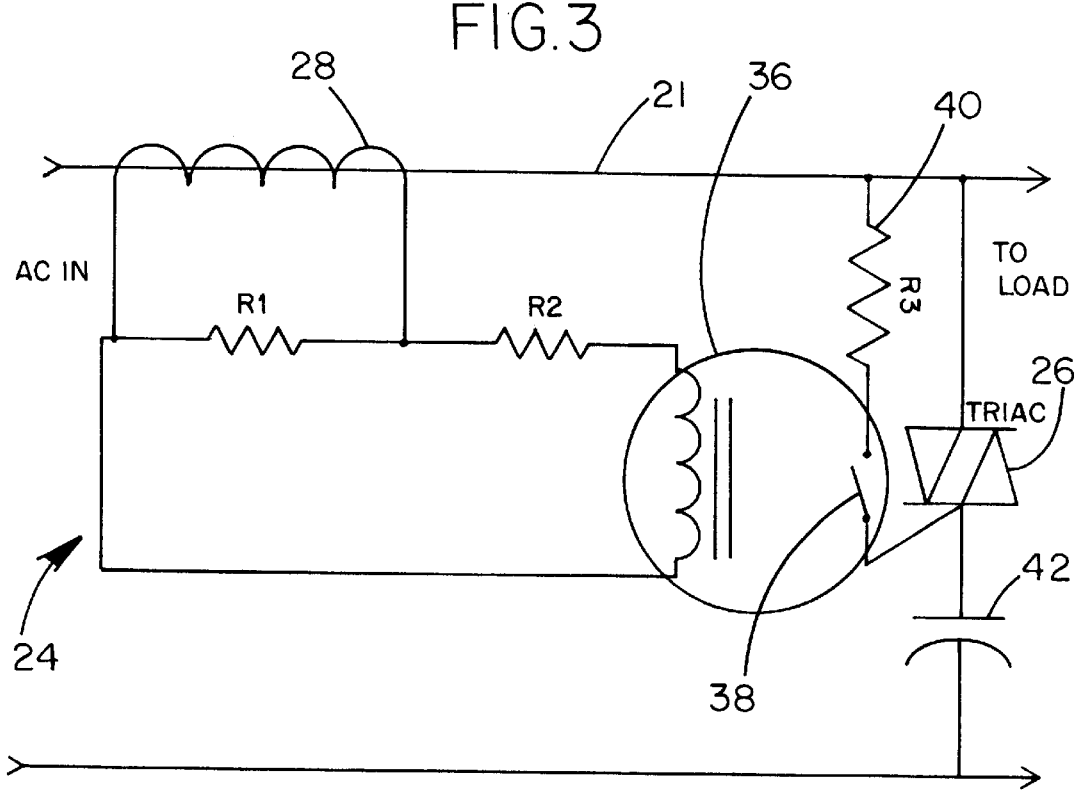
FIG. 3 is a schematic diagram of still yet another the present invention.

As shown in FIGS. 2–3, the triggering means may include a current transformer 28 connected with a first resistor 30 to form a parallel combination which is, in turn, connected in series with a second resistor 32. Such parallel combination and second resistor are further connected to a relay means to form a closed loop. It should be noted that the relay means may include an electronic relay 34, as shown in FIG. 2, or in the alternative, comprise of a mechanical relay 36, as shown in FIG. 3. Whichever form of a relay is used, the relay means has a switch means 38 associated therewith connected between the gate of the triac means and one of the interconnect wires to which the current transformer is connected. For limiting purposes, a third resistor 40 is connected between the switch means and the interconnect wire to which the current transformer is connected.

Finally, a capacitor 42 is connected between the interconnect wires in series with the triac. In the preferred embodiment, the capacitor is sized for providing a predetermined amount of power lag compensation by producing negative reactive volt-amperes when the triac is in receipt of the activation signal. As such, the present invention reduces the rate at which the appliance draws current. The size of the capacitor is preferably proportional to the power consumption of the appliance to which it is connected. It should be noted that in the preferred embodiment, a surge arrester 44 is connected between the interconnect wires in parallel with the capacitor and triac combination.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A power lag compensation device comprising:

a housing;

a socket assembly situated within the interior space of the housing for releasably receiving a plug connected to an appliance for being in electrical communication therewith;

a plug assembly mounted on the housing and extending therefrom exterior of the housing, the plug assembly including a pair of spaced parallel rectangular prongs, the rectangular prongs each having an associated interconnect wire connected to a corresponding socket of the socket assembly, the plug assembly adapted to releasably insert within a socket which is connected to an alternating current power source;

triggering means in communication with one of the interconnect wires within the housing, the triggering means adapted for producing an activation signal upon the detection of a current flow therethrough;

a triac means connected between the interconnect wires within the housing, the triac means having a gate connected to the triggering means for allowing communication between the interconnect wires only during the receipt of the activation signal; and a capacitor connected between the interconnect wires in series with the triac means for providing a predetermined amount of power lag compensation when the triac means is in receipt of the activation signal;

wherein the triggering means includes a current transformer;

wherein the current transformer is connected with a first resistor to form a parallel combination which is connected in series with a second resistor.

2. A power lag compensation device as set forth in claim 1 wherein the housing is portable.

3. A power lag compensation device as set forth in claim 1 wherein the plug assembly includes a cylindrical prong having a ground wire connected to a socket of the socket assembly.

4. A power lag compensation device as set forth in claim 1 wherein the triggering means includes a relay means.

5. A power lag compensation device as set forth in claim 1 wherein the parallel combination and second resistor are connected to a relay means to form a closed loop.

6. An power lag compensation device as set forth in claim 5 wherein the relay means is a mechanical relay.

7. An power lag compensation device as set forth in claim 6 wherein the relay means is an electronic relay.

8. A power lag compensation device as set forth in claim 6 wherein the relay means has a switch means associated therewith connected between the gate of the triac means and one of the interconnect wires to which the current transformer is connected.

9. An power lag compensation device as set forth in claim 8 wherein a third resistor is connected between the switch means and the interconnect wire to which the current transformer is connected.

* * * * *